(12) United States Patent
Whitehouse et al.

(10) Patent No.: US 12,246,645 B2
(45) Date of Patent: Mar. 11, 2025

(54) PARKING AID CONTROL SYSTEM AND METHOD

(71) Applicant: JAGUAR LAND ROVER LIMITED, Warwickshire (GB)

(72) Inventors: Stuart Whitehouse, Coventry (GB); Ruben Gomez Padin, Coventry (GB)

(73) Assignee: JAGUAR LAND ROVER LIMITED, Coventry (GB)

( * ) Notice: Subject to any disclaimer, the term of this patent is extended or adjusted under 35 U.S.C. 154(b) by 28 days.

(21) Appl. No.: 18/250,830

(22) PCT Filed: Oct. 29, 2021

(86) PCT No.: PCT/EP2021/080198
§ 371 (c)(1),
(2) Date: Apr. 27, 2023

(87) PCT Pub. No.: WO2022/090507
PCT Pub. Date: May 5, 2022

(65) Prior Publication Data
US 2023/0391256 A1   Dec. 7, 2023

(30) Foreign Application Priority Data
Oct. 30, 2020   (GB) ..................................... 2017205

(51) Int. Cl.
*B60Q 9/00*   (2006.01)
*G06F 3/16*   (2006.01)

(52) U.S. Cl.
CPC ............. *B60Q 9/002* (2013.01); *B60Q 9/006* (2013.01); *G06F 3/16* (2013.01); *B60T 2201/10* (2013.01)

(58) Field of Classification Search
CPC ... B62D 15/028; B62D 15/027; B60W 50/14; G08G 1/168; G08G 1/143; G08G 1/167;
(Continued)

(56) References Cited

U.S. PATENT DOCUMENTS 6,483,442 B2 *   11/2002   Shimizu ................... B60R 1/26
                                                                340/901
10,913,496 B2 *   2/2021   Yamashita ......... B62D 15/0285
(Continued)

FOREIGN PATENT DOCUMENTS

EP   2948361 A1   12/2015
GB   2543651 A    4/2017
(Continued)

OTHER PUBLICATIONS

International Search Report and Written Opinion of the International Searching Authority for International application No. PCT/EP2021/080198 dated Feb. 9, 2022.
(Continued)

*Primary Examiner* — John A Tweel, Jr.
(74) *Attorney, Agent, or Firm* — Carlson, Gaskey & Olds, P.C.

(57) ABSTRACT

There is provided a parking aid control system (110) and method (600) for a vehicle (200). The control system (110) is configured to receive proximity data (125) indicative of a location of one or more objects (400) in an environment of the vehicle. The control system (110) is configured to output, to a parking aid interface (500) of the vehicle, parking aid data (135) indicative of the location of at least some of the one or more objects (400). A cancellation signal (155) is received indicative of a user input for inhibiting the parking aid interface (500). A gear change signal (145) is received, the gear change signal (145) being indicative of a change in a gear selection of the vehicle. The control system (110) is configured to suppress the inhibition of the parking aid interface in dependence on the gear change signal (145).

10 Claims, 6 Drawing Sheets

(58) Field of Classification Search
CPC ...... B60R 2300/806; B60R 2001/1253; B60Q 9/002
See application file for complete search history.

(56) References Cited

U.S. PATENT DOCUMENTS

| | | |
|---|---|---|
| 2015/0203081 A1 | 7/2015 | Paulson |
| 2018/0126964 A1 | 5/2018 | Korte et al. |
| 2022/0176876 A1* | 6/2022 | Whitehouse .......... B60W 30/06 |
| 2023/0303062 A1* | 9/2023 | Krekel ............... B62D 15/0285 |

FOREIGN PATENT DOCUMENTS

| | | |
|---|---|---|
| JP | 2012111263 A | 6/2012 |
| KR | 1020140052421 A | 5/2014 |

OTHER PUBLICATIONS

Examination Report under Section 18(3) for Application No. GB2017205.2 dated Dec. 19, 2022.
Search Report under Section 17 for Application No. GB2017205.2 dated Aug. 31, 2021.

* cited by examiner

PARKING AID CONTROL SYSTEM AND METHOD

TECHNICAL FIELD

The present disclosure relates to a parking aid control system and method. Aspects of the invention relate to a control system, a vehicle, a computer-implemented method and a computer-readable medium.

BACKGROUND

It is known to provide a parking aid system to aid the driver in adjusting a final position of a vehicle in a manoeuvre. Such parking aid systems typically comprise parking sensors associated with the vehicle for detecting proximal objects, and a parking aid interface on a display for outputting an indication of the location of the proximal objects. This output may not always be desired, for example if the driver is already aware of the proximal objects. Thus, the driver of the vehicle may manually inhibit the parking aid interface by closing the parking aid interface on the display, particularly if the indication on the display is accompanied by an audible output warning of the vehicle's proximity to the objects. The inhibition is reset when the vehicle exceeds a threshold speed, in order to be available for subsequent parking manoeuvres. However, if the driver inhibits the parking aid interface at the beginning of, or during, a manoeuvre, as a consequence the driver may not be notified of relevant objects later in the parking manoeuvre when the output may again be desired. This may be particularly problematic when the driver has forgotten about the previous inhibition and is expecting to be notified of objects later in the manoeuvre.

It is an aim of the present invention to address one or more of the disadvantages associated with the prior art.

SUMMARY OF THE INVENTION

Aspects and embodiments of the invention provide a control system, a vehicle, a method and a computer-readable medium as claimed in the appended claims.

According to an aspect of the present invention there is provided a parking aid control system for a vehicle. The control system comprises one or more controller. The control system is configured to: receive proximity data indicative of a location of one or more objects in an environment of the vehicle; output, to a parking aid interface of the vehicle, parking aid data indicative of the location of at least some of the one or more objects; receive a cancellation signal indicative of a user input for inhibiting the parking aid interface; receive a torque configuration signal indicative of a selection of a change in available traction torque for the vehicle; and suppress the inhibition of the parking aid interface in dependence on the torque configuration signal. The torque configuration signal may be indicative of a selection of a gear of a transmission between a torque generator such as an engine or traction electric motor which may influence a range of available traction torque at a wheel of the vehicle and/or a direction of traction torque at the wheel. The torque configuration signal may be a selection of a change in engine rotation direction of a traction electric motor. Advantageously, the inhibition may be reset each time a driver selects a different configuration, such as between forward and reverse in a parking manoeuvre. In this way, if a driver inhibits the parking aid interface early in a manoeuvre, relevant objects detected at a later point in the same parking manoeuvre may not be erroneously inhibited.

According to an aspect of the present invention there is provided a parking aid control system for a vehicle. The control system comprises one or more controller. The control system is configured to: receive proximity data indicative of a location of one or more objects in an environment of the vehicle; output, to a parking aid interface of the vehicle, parking aid data indicative of the location of at least some of the one or more objects; receive a cancellation signal indicative of a user input for inhibiting the parking aid interface; receive a gear change signal indicative of a change in a gear selection of the vehicle; and suppress the inhibition of the parking aid interface in dependence on the gear change signal. Advantageously, the inhibition may be reset each time the vehicle gear is changed, such as between forward and reverse in a parking manoeuvre. In this way, if a driver inhibits the parking aid interface early in a manoeuvre, the inhibition will reset for each new portion such that relevant objects detected at a later point in the same parking manoeuvre are not erroneously inhibited.

The control system may be configured to inhibit the parking aid interface in dependence on receiving the cancellation signal. Suppressing the inhibition may comprise mitigating an effect of the cancellation signal.

Optionally, the control system is configured to selectively output a signal to generate the parking aid interface in dependence on the location of the one or more objects. Inhibiting the parking aid interface may comprise inhibiting the selective output of the signal to generate the parking aid interface. The signal may be selectively output in dependence on the location of at least some of the one or more objects being within a predetermined distance of the vehicle. That is, the parking aid interface may be generated responsive to the vehicle approaching an object. When the parking aid interface is inhibited, the parking aid interface may not be responsively generated. Advantageously, the parking aid interface will not be triggered to reappear upon detecting an object when it has been inhibited, preventing driver annoyance.

Optionally, suppressing the inhibition comprises the control system outputting the signal to generate the parking aid interface. The parking aid interface may then be immediately regenerated in dependence on the gear change signal.

Optionally, the control system is configured to suppress the inhibition by enabling the selective output of the signal to generate the parking aid interface. That is, future selective output of the signal is enabled. In this way, the parking aid interface may not be immediately regenerated, but is available for generation. Subsequent detection of proximal objects may again cause the parking aid interface to be generated, in contrast to the inhibited state.

Optionally, the parking aid interface comprises a parking aid display element on a vehicle display. The control system may be configured to inhibit the parking aid interface by inhibiting the parking aid display element on the vehicle display. Beneficially, inhibiting the display element when not required frees the vehicle display for other use. Said inhibiting may comprise removing the parking aid display element from the vehicle display or reducing a size or prominence of the parking aid display element on the vehicle display.

Optionally, the parking aid interface comprises one or more audio output devices for providing audible output indicative of the location of the one or more objects. The control system may be configured to inhibit the parking aid interface by inhibiting the audible output. Said inhibiting may comprise removing the audible output or reducing a volume of the audible output. Beneficially, inhibiting the audible output when not desired may prevent annoyance of the user.

Optionally, the control system is configured to output an indication to the user that the parking aid interface is inhibited in dependence on the cancellation signal. In some embodiments, the indication may comprise a display element such as a light or an icon on a vehicle display. The indication may be persistent whilst the parking aid interface is inhibited. Beneficially, the user may be readily able to check whether the parking aid interface is inhibited.

Optionally, the control system may be configured to output an indication to the user that the parking aid interface is not inhibited in dependence on the gear change signal. When the parking aid interface is not inhibited, the parking aid interface is available to be generated following detection of proximal objects. The indication may comprise a display element such as a light or an icon on a vehicle display. The indication may be persistent whilst the parking aid interface is available to be generated. Beneficially, the user may be readily able to check whether the parking aid interface is enabled.

Optionally, the gear change signal is indicative of a change between a forward gear and a reverse gear. For example, the gear change signal may be indicative of a change from a forward gear to a reverse gear, or a reverse gear to a forward gear. Beneficially, a change in direction from forward to reverse or vice versa may indicate a new portion of a parking manoeuvre, such as when a driver is shuffling back and forth into a parking space. Inhibition of a parking aid interface for an object detected in the forward portion may not mean the driver doesn't wish to be notified about objects encountered in the reverse portion. Thus, the inhibition may be reset to ensure the parking aid interface may be generated when an object is approached in the new direction. The gear change may be indirect. For example, the gear change signal may be indicative of a change from a forward gear to a reverse gear via a neutral gear.

Optionally, the gear change signal may be indicative of a change between a neutral gear and a drive gear of the vehicle. The drive gear may be one or a forward or reverse gear.

Optionally, the one or more controller comprise: at least one electrical input for receiving the cancellation signal, the gear change signal and the proximity data; an electrical output for outputting the parking aid data to the parking aid interface; and one or more electronic processors for operatively executing computer-readable instructions to suppress the inhibition of the parking aid interface.

The computer-readable instructions may be stored in a computer-readable medium accessible to the one or more electronic processors.

According to another aspect, there is provided a vehicle comprising a parking aid control system as described above.

According to a further aspect, there is provided a computer-implemented method for providing parking aid in a vehicle, the method comprising: receiving proximity data indicative of a location of one or more objects in an environment of the vehicle; outputting, to a parking aid interface of the vehicle, parking aid data indicative of the location of at least some of the one or more objects; receiving a cancellation signal indicative of a user input for inhibiting the parking aid interface; receiving a gear change signal indicative of a change in a gear selection of the vehicle; and suppressing the inhibition of the parking aid interface in dependence on the gear change signal.

The method may comprise selectively outputting a signal to generate the parking aid interface in dependence on the location of the one or more objects. Inhibiting the parking aid interface may comprise inhibiting the selective output of the signal to generate the parking aid interface. Optionally, the suppressing the inhibition comprises the control system outputting the signal to generate the parking aid interface. Optionally, the suppressing the inhibition comprises enabling the selective output of the signal to generate the parking aid interface.

The parking aid interface may comprise a parking aid display element on a vehicle display. The method may optionally comprise inhibiting the parking aid interface by inhibiting the parking aid display element on the vehicle display.

The parking aid interface may comprise one or more audio output devices for providing audible output indicative of the location of the one or more objects. The method may comprise inhibiting the parking aid interface by inhibiting the audible output.

The method optionally comprises outputting an indication to the user that the parking aid interface is inhibited in dependence on the cancellation signal. The method may comprise outputting an indication to the user that the parking aid interface is not inhibited in dependence on the gear change signal.

The gear change signal may be indicative of a change between a forward gear and a reverse gear. The gear change signal may be indicative of a change between a neutral gear and a drive gear of the vehicle.

According to a further aspect, there is provided a computer-readable medium comprising computer software which, when executed, causes the performance of the above method.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

Figure 2:
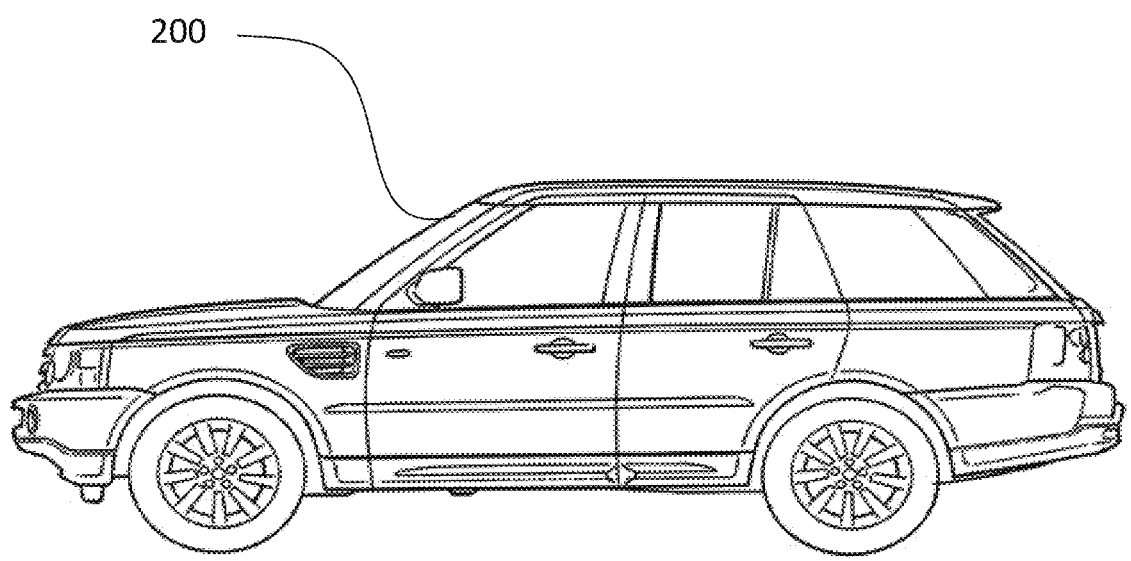
FIG. 2 shows a vehicle 200 in accordance with an embodiment of the invention.

A parking aid system 100 in accordance with an embodiment of the present invention will now be described with reference to the accompanying figures. The parking aid system 100 is for selectively alerting a driver to objects in the proximity of a vehicle, as will be explained. As shown in FIG. 2, the parking aid system 100 is installed in a vehicle 200. The vehicle 200 in the present embodiment is an automobile, such as a wheeled vehicle, but it will be understood that the parking aid system 100 may be used in other types of vehicle, particularly but not exclusively other land vehicles.

Figure 1:
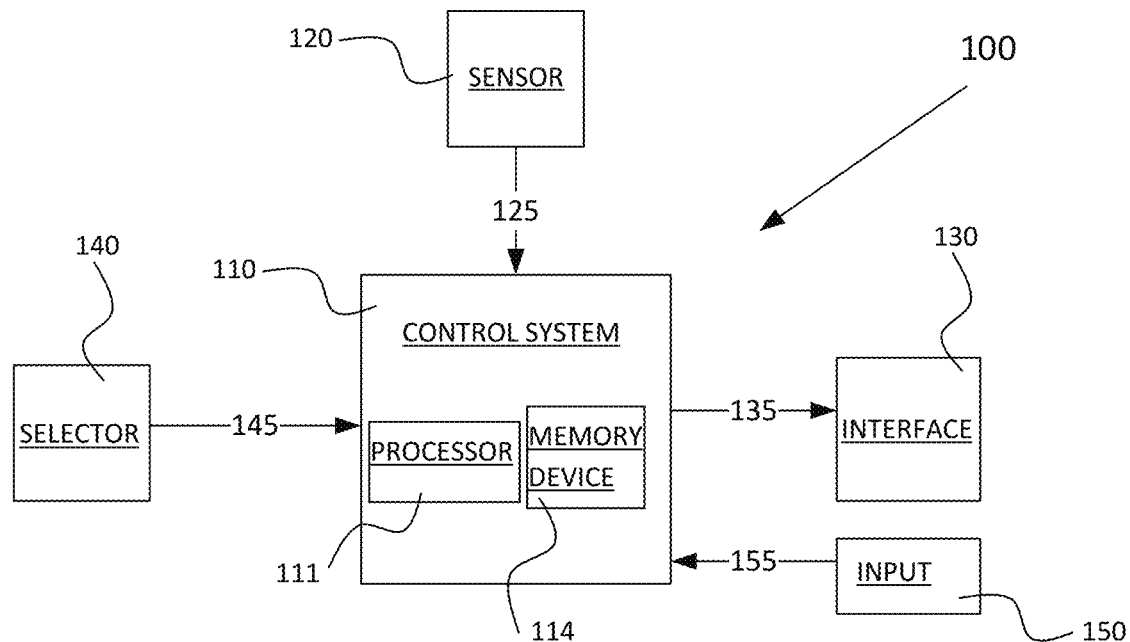
FIG. 1 shows a schematic illustration of a parking aid system 100 according to an embodiment.

With reference to FIG. 1, the parking aid system 100 comprises a control system 110. The control system 110 may be formed by one or more controller 110 which comprises processing means 111 and memory means 114. The processing means 111 may be one or more electronic processing devices 111 or processors 110 which operably execute computer-readable instructions. The memory means 114 may be one or more memory devices 114. The memory means 114 is electrically coupled to the processing means 111. The memory means 114 is configured to store instructions, and the processing means 111 is configured to access the memory means 114 and execute the instructions stored thereon.

The control system 110 is communicably coupled to one or more sensor units 120 associated with the vehicle 200. Each sensor unit 120 in the present embodiment comprises at least one proximity sensor for detecting objects in the vicinity of the vehicle. Each proximity sensor, also referred to as a parking sensor, may comprise an ultrasonic sensor, a radar sensor or a LIDAR sensor. Alternatively, or in addition, the sensor unit 120 may comprise other types of sensors, such as one or more optical cameras. Although not illustrated in FIG. 1 the control system 110 may comprise a plurality of sensor units 120.

Figure 3:
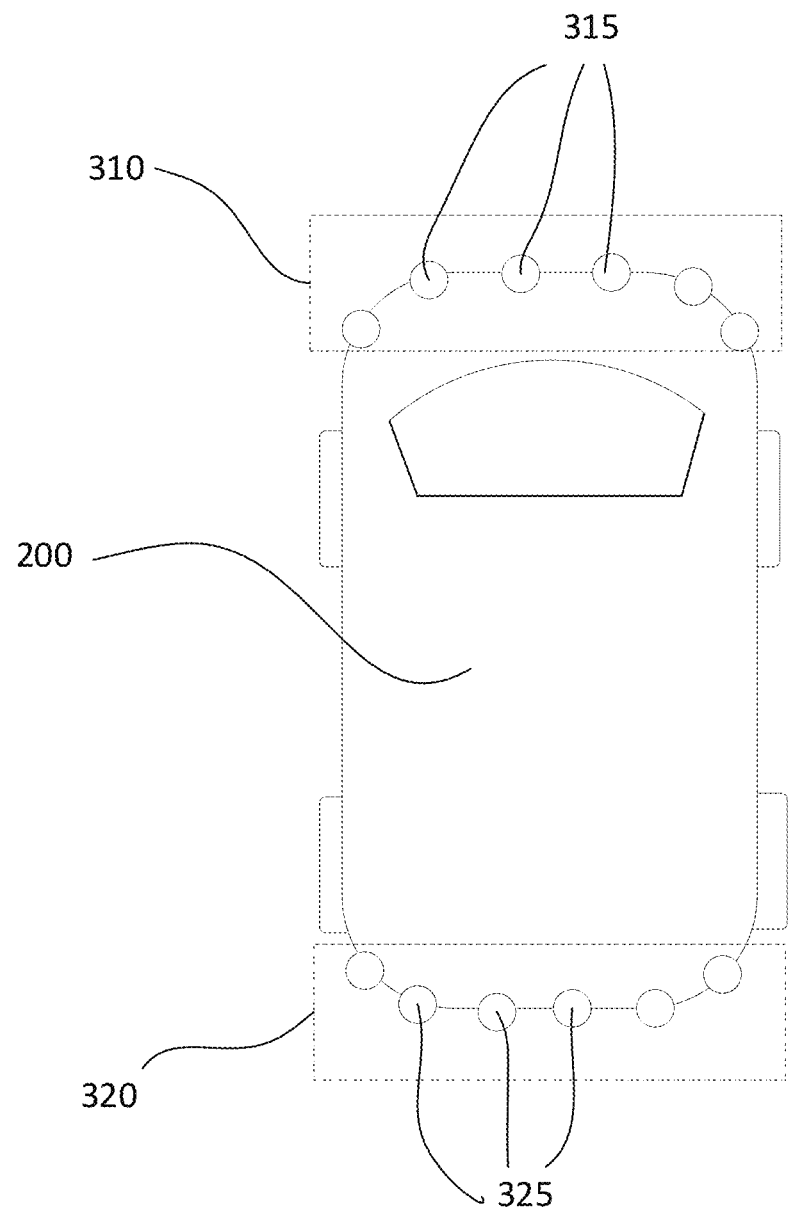
FIG. 3 shows a schematic illustration of an arrangement of sensor units on the vehicle 200 according to an embodiment of the invention.

In an embodiment of the invention, the control system 110 is communicably coupled to at least two sensor units 120. The at least two sensor units 120 comprise a front sensor unit 310 and a rear sensor unit 320 as illustrated in FIG. 3. The front sensor unit 310 comprises an arrangement of a plurality of front proximity sensors 315 or sensor devices 315. Each front proximity sensor 315 is arranged to detect objects in the vicinity of a respective region of a front of the vehicle. In some embodiments, the region of each sensor 315 may overlap partially with that of another sensor 315 in order to provide broad coverage. In some embodiments, the front proximity sensors 315 may be arranged on or within a body of the vehicle, such as on a front bumper of the vehicle. The front proximity sensors 315 may further extend, at least partially, to either side of the vehicle. The rear sensor unit 320 comprises an arrangement of a plurality of rear proximity sensors 325. Each rear proximity sensor 325 is arranged to detect objects in the vicinity of a respective region of a rear of the vehicle. In some embodiments, the rear proximity sensors 325 may be arranged on or within a body of the vehicle, such as on a rear bumper of the vehicle. The rear proximity sensors 325 may further extend, at least partially, to either side of the vehicle. It will be appreciated that in other embodiments, the sensor unit(s) may be alternatively arranged. For example, all proximity sensors 315, 325 associated with the vehicle may form a single sensor unit 120. In some embodiments, more than two sensor units 120 may be associated with the vehicle. For example, a plurality of sensor units 120 may be associated with each of the front and the rear of the vehicle. In some embodiments, one or more sensor units 120 may be associated with each lateral side of the vehicle.

The control system 110 is configured to receive proximity data 125 from the or each sensor unit 120 indicative of the environment of the vehicle 200. The proximity data 125 is indicative of a location of one or more objects in an environment of the vehicle 200.

The control system 110 is communicably coupled to at least one user interface 130 associated with the vehicle 200. In an illustrated embodiment, the user interface 130 comprises one or more display devices 130 for displaying information associated with the one or more objects to an occupant, such as a driver of the vehicle. The user interface 130 may additionally or alternatively comprise one or more audio output devices such as speakers. The user interface 130 may additionally or alternatively comprise one or more haptic feedback devices, for example a haptic feedback device arranged in a steering wheel of the vehicle. The control system 110 is configured to output parking aid signal 135 to the user interface 130 indicative of the location of at least some of the objects detected by the sensor unit 120. The parking aid signal 135 is configured to control the user interface 130 to output an indication of the location of the objects to the driver. Said output of the indication of the objects to the driver may be referred to as a parking aid interface. The indication may comprise one or more of a visual indication, an audible indication or a somatosensory indication of the location of the objects.

Figure 4A:
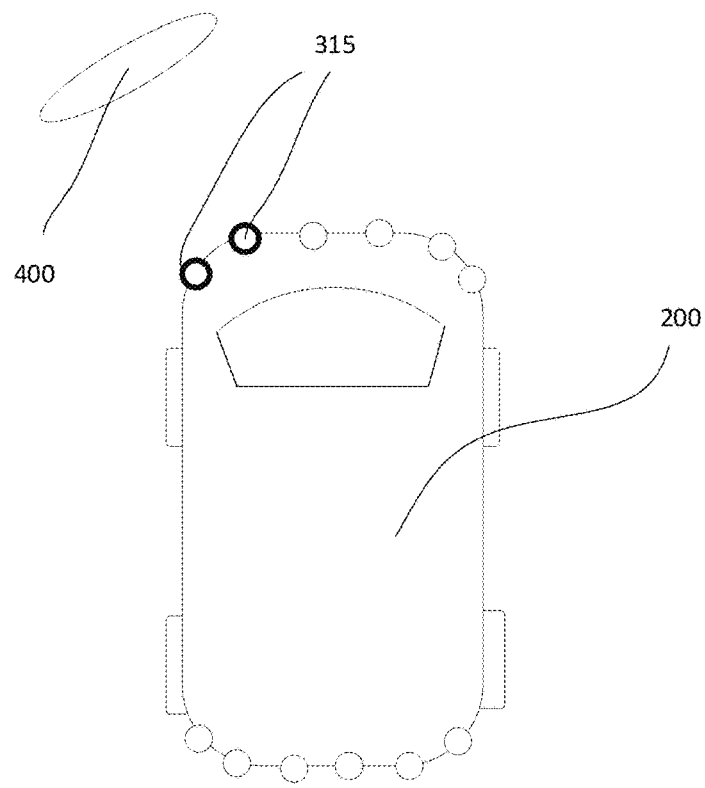
FIG. 4A illustrates the detection of an object by the sensor units.
Figure 4B:
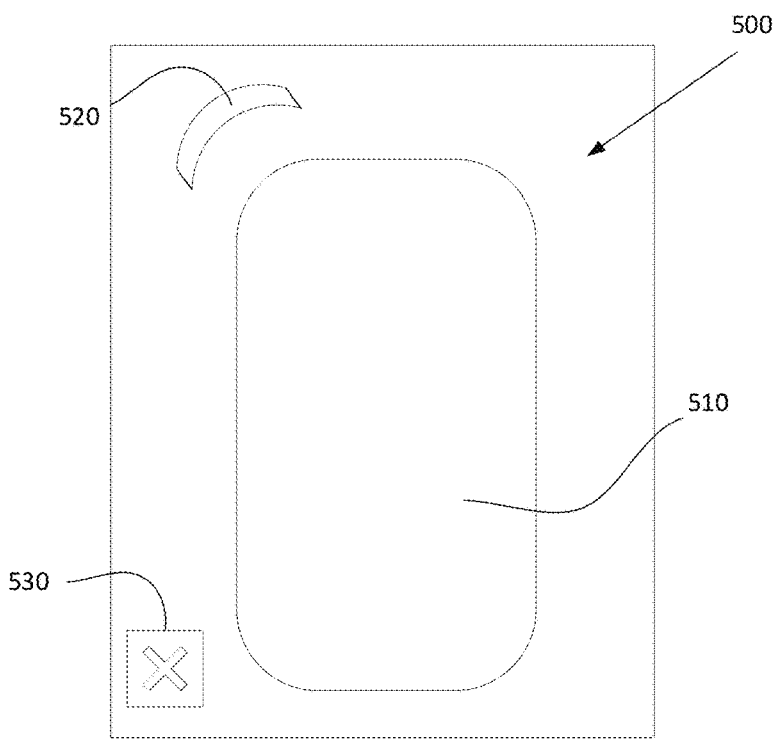
FIG. 4B illustrates an example display output of the parking aid system.

In an illustrated embodiment, as shown in FIG. 4A, an object 400 is detected by at least some of the front proximity sensors 315 of the vehicle. The control system 110 outputs a parking aid signal 135 to the user interface 130. The user interface 130 is then configured to generate or output a parking aid interface 500. In some embodiments, a display device 130 of the user interface is configured to generate or output a parking aid interface 500 on the display device 130. The parking aid interface 500 comprises an indication of the location of the object, such as illustrated in FIG. 4B. In the illustrated embodiment, the parking aid interface 500 comprises a representation 510 of at least a portion of the vehicle, and a visual representation 520 of the location of the object 400 with respect to the vehicle. The visual representation 520 may comprise a line, block or other simplified illustration of the object 400 placed at the relevant location with respect to the representation 510 of the vehicle, as shown in FIG. 4B. In other embodiments, the representation 520 may comprise a rendering or an image of the object 400 as detected by the sensor unit 120 or one or more additional sensors such as cameras associated with the vehicle 200. The representation 520 may comprise an augmented representation of the object 400, for example the representation 520 may comprise highlighting or circling to emphasise the location of the object 400. The rendering may also include rendering of at least a portion of the vehicle 510. It will be appreciated that alternative representations may be used. The parking aid interface 500 may also comprise a cancellation element 530 which may be selected by a user if the parking aid interface 500 is displayed on an interactive display such as a touch screen. A user may select the cancellation element 530 to inhibit the parking aid interface 500, as will be explained.

Figure 5A:
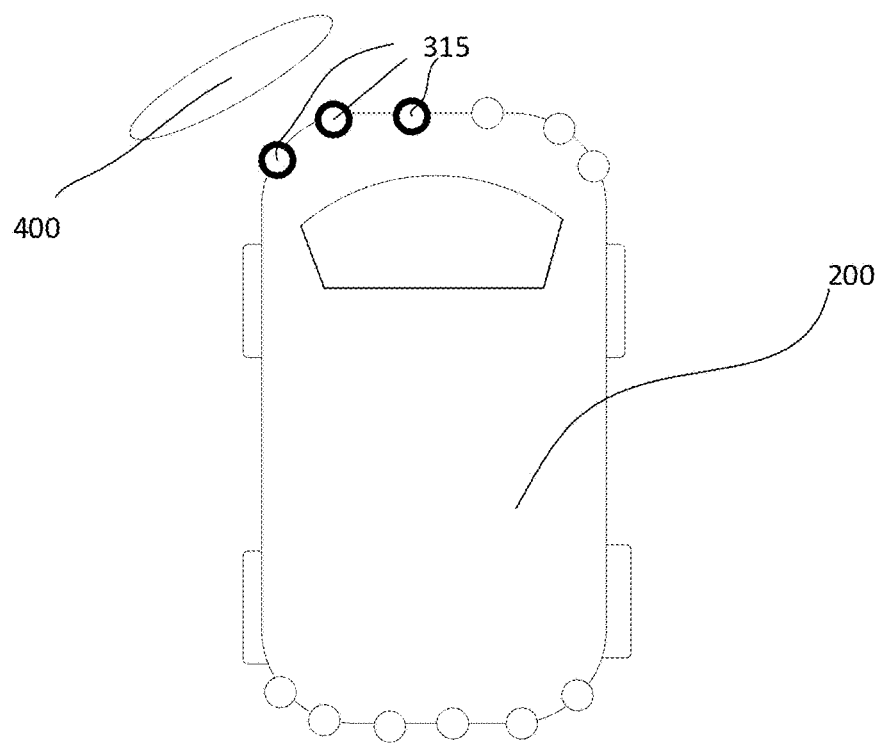
FIG. 5A illustrates the detection of an object by the sensor units.
Figure 5B:
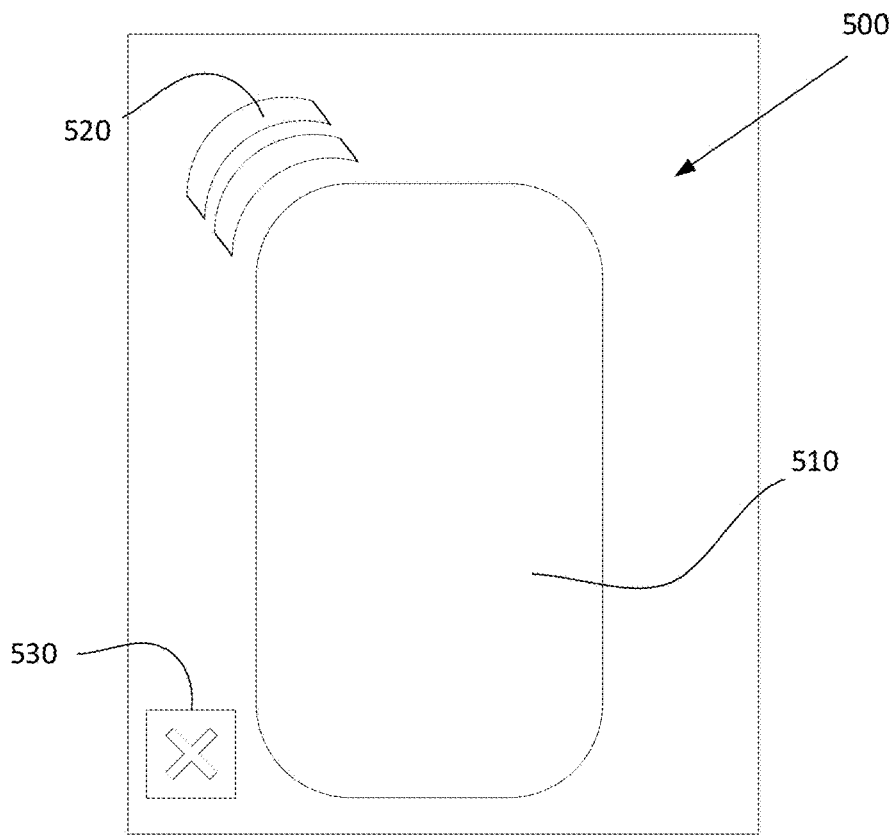
FIG. 5B illustrates an example display output of the parking aid system.

The visual representation 520 of the location of the object 400 may vary depending on the proximity of the object 400 to the vehicle. FIG. 5A illustrates an example where the vehicle 200 is situated closer to the object 400 than in FIG. 4A. The parking aid interface 500 displayed by the display device may then be configured to change to reflect the increased proximity of the vehicle to the object 400. The representation 520 of the location of the object may be made more prominent, such as by increasing the size, shape or quantity of the representation 520. As illustrated in FIG. 5B, the representation 520 is made more prominent by an increase in the number of blocks forming the representation 520. In other embodiments, the control system may be configured to output the parking aid signal 135 to adjust the colour, brightness or location of the representation 520 on the display device 130.

Alternatively, or additionally, the control system may be configured to output the parking aid signal 135 to an audio output device to output an audible indication of the location of the object 400. The control system 110 may be configured to cause the audible indication to vary, for example in frequency or volume, to indicate the relative proximity of the object to the vehicle. In some embodiments, the audio output device is configured to output sound as though emanating approximately from the location of the object relative to the vehicle.

The control system 110 may in some embodiments be configured to determine the parking aid signal 135 in dependence on a direction of travel of the vehicle. In particular, objects towards which the vehicle is travelling may be selectively notified or highlighted to the driver in preference to those in an opposing direction. For example, the parking aid signal 135 may only comprise an indication of the location of objects towards which the vehicle is travelling. In these embodiments, no indication, or a lower priority indication, may be output to the driver of the location of objects detected by the proximity sensors but from which the vehicle is diverging. Alternatively, the parking aid signal 135 may comprise supplementary data highlighting the objects towards which the vehicle is travelling. In this way, an indication may be output to the driver of the location of all detected objects, but the objects towards which the vehicle is travelling may be specifically highlighted. For example, the specific highlighting may comprise the provision of an extra audible notification or visual highlighting.

The control system 110 is communicably coupled to at least one user input device 150 for receiving user input. In some embodiments, the user input device 150 may be integrated with the user interface 130. The user input device 150 may be configured to receive touch input, visual input or audible input from a user of the vehicle 200. In some embodiments, the user input device may be integrated with the display device of the user interface 130 to form a touch screen. Alternatively, or additionally, the parking aid system 100 may comprise one or more user input devices 150 separate to the display device, such as a keypad, button, microphone, camera or the like suitable for receiving a user input such as a spoken indication or user gesture. The user input device 150 is configured to receive a user input for inhibiting the parking aid interface 500. In the example illustrated in FIGS. 4B and 5B, the user input may be a selection of the cancellation element 530 on the parking aid interface 500. A user of the vehicle may wish to inhibit the parking aid interface 500 for a variety of reasons, for example if the user is aware of the object(s) indicated, or if the particular indication being output is causing irritation to the user. Perpetuation of the output of the indication in this circumstance may cause user inconvenience. For example, perpetuation of the parking aid interface 500 on the display device may cause inconvenience should the user wish to utilise the display for another purpose such as navigation. In other embodiments, the user may wish to cease the audible indication of the location of the object from the audio output. The user input device 150 is configured to transmit to the control system 110 a cancellation signal 155 indicative of the user input for inhibiting the parking aid interface 500. The parking aid interface 500 may be inhibited in a number of ways, for example by removing the parking aid interface 500 from the display, reducing the display output of the location of the object on the display, or ceasing output of the audible indication, as will be explained. The parking aid interface may then be inhibited until such a time as the inhibition is suppressed.

The control system 110 is communicably coupled to a torque configuration selector 140. The torque configuration selector 140 may be configured to control a gear of a transmission between a torque generator and a wheel of the vehicle. The torque generator may be an engine or traction electric motor which may influence a direction of traction torque at the wheel of the vehicle. The torque configuration signal may be a selection of a rotation direction of a traction electric motor. The control system 110 is configured to receive, from the torque configuration selector, a torque configuration change signal 145 indicative of a change in a torque configuration selection of the vehicle made by the driver of the vehicle. For example, the torque configuration change signal 145 may be indicative of a change in a selection of a rotation direction of a traction electric motor. The communication between the control system 110 and the torque configuration selector 140 is for the purpose of resetting or suppressing the inhibition of the parking aid interface.

In some embodiments, the torque configuration selector 140 comprises a gear selector 140 associated with a gearbox. A user may select a gear for the vehicle at an interface associated with the gear selector 140. The gear selector 140 may comprise a manual gear selection interface such as a gear stick, lever or manual control. The driver may thus select a gear for the vehicle by adjusting a position of the gear selector 140. In some embodiments, the gear selector 140 may comprise an electronic user interface through which the driver of the vehicle may select a gear for the vehicle. The electronic user interface may for example comprise a touch screen, paddle or button. The control system 110 is configured to receive, from the gear selector 140, a gear change signal 145 indicative of a change in a gear selection of the vehicle made by the driver of the vehicle. In some embodiments, the gear change signal 145 may not be received directly from the gear selector 140, but rather via one or more further vehicle control systems. The gear change signal 145 may be utilised by the control system 110 to determine to suppress the inhibition of the parking aid interface, as will be explained.

Figure 6:
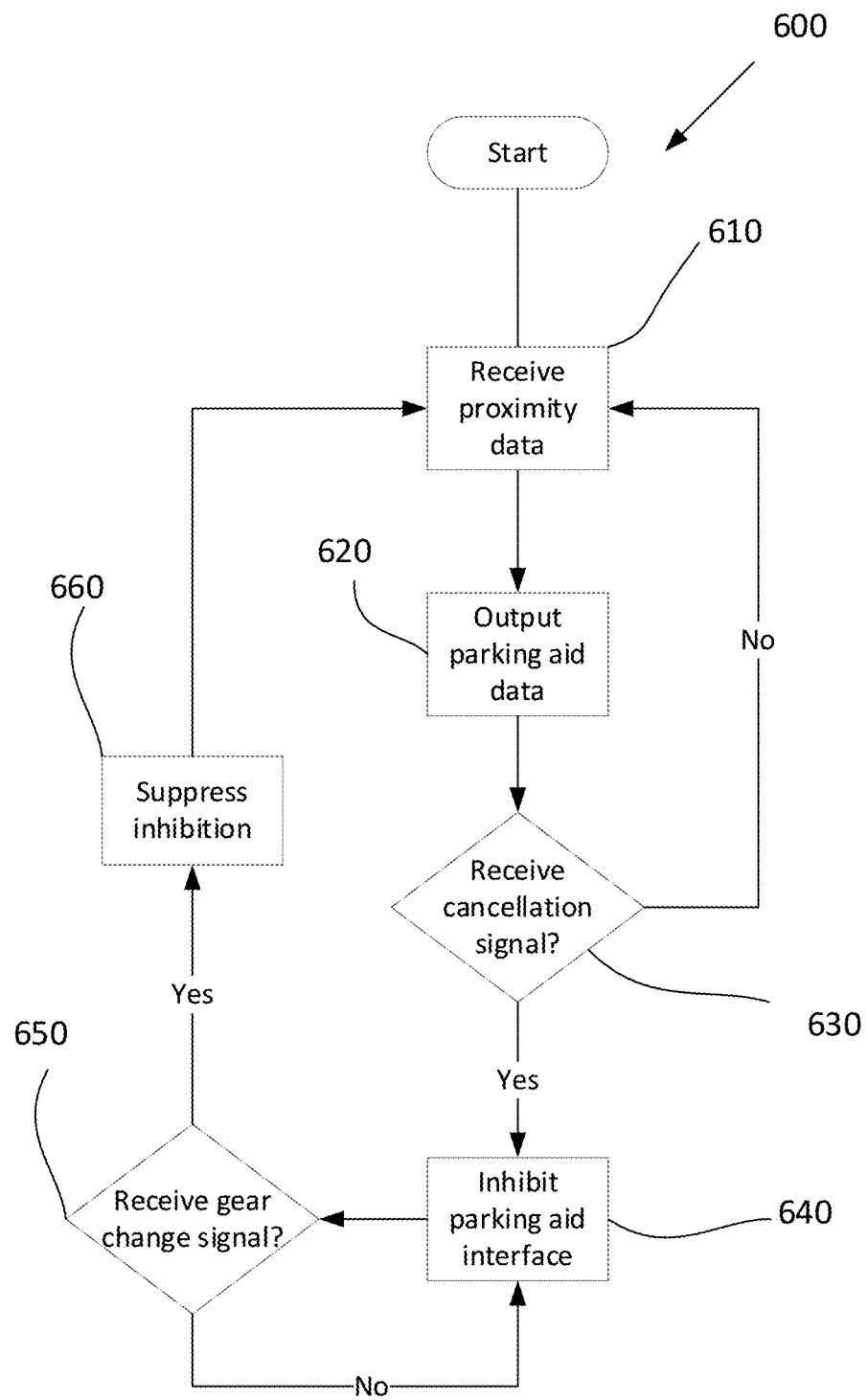
FIG. 6 illustrates a method 600 according to an embodiment of the invention.

A method 600 for selectively generating the parking aid signal 135 by the control system 110 is illustrated in FIG. 6.

The method 600 comprises a step 610 of receiving the proximity data 125. The proximity data 125 is indicative of a location of one or more objects in an environment of the vehicle. The proximity data 125 is received from at least some of the plurality of proximity sensors 315, 325. With reference to the example illustrated in FIGS. 4A to 5B, the proximity data 125 may be indicative of a location of the object 400 relative to the vehicle.

In step 620, the control system 110 is configured to output, to a parking aid interface 500 of the vehicle, parking aid data 135 indicative of the location of at least some of the one or more objects. The parking aid interface may be generated on a user interface 130 of the vehicle, as explained above. The parking aid data 135 is transmitted to the parking aid interface 500 for outputting to a user of the vehicle an indication of the location of the objects. In the illustrative example in FIGS. 4B and 5B, the parking aid interface 500 is generated as a display element on a display device associated with the vehicle and is configured to display an indication of the location of each object in the parking aid data 135. The parking aid data 135 may change over time to reflect a changing position of each object with respect to the vehicle.

In step 620, the control system 110 may selectively output a signal to the user interface 130 to generate the parking aid interface 500 if the parking aid interface 500 is not yet generated i.e. to create the parking aid interface 500. The control system 110 may output the signal to generate the parking aid interface 500 in dependence on the location of the one or more objects. In particular, the parking aid interface may be generated in dependence on the proximity data 125 indicating that one or more of the objects are within a predetermined distance of the vehicle 200. In this way, the parking aid interface 500 need not be constantly generated during use of the vehicle 200, enabling the user interface 130 to fulfil other functions for the user when the parking aid interface 500 is not required. The parking aid interface 500 may be selectively generated when the proximity sensors associated with the vehicle 200 detect that the vehicle is approaching an object, to alert a user of the vehicle to the object. The parking aid interface may also be selectively generated in step 620 manually in response to a user input at the user input device 150 to select the parking aid interface 500.

In step 630, a cancellation signal 155 may be received from the user input device 150. The cancellation signal 136 is indicative of a user input at the input device 150 for inhibiting the parking aid interface 500. The user input may be a tactile input to a touch screen, button or other input device, an audible input or a visual gesture. In the illustrative example of FIGS. 4B and 5B, the user input may be a selection of the cancellation element 530 on the parking aid interface 500 generated on a touch screen display 150. In other embodiments, the user input may be an auditory input to a microphone or other auditory input device 150 or a visual gesture to a camera.

If no cancellation signal 155 is received by the control system 110, the method 600 may continue to perform steps 610, 620 and 630. The parking aid interface 500 may be maintained and the location of the one or more objects may be continuously output to the user of the vehicle 200. The parking aid interface 500 may cease to be generated when a predefined condition is met. For example, the parking aid interface 500 may be generated until no objects are detected within a threshold distance of the vehicle 200.

When a cancellation signal 155 is received in step 630, the method may proceed to step 640. In step 640, the control system 110 inhibits the parking aid interface 500 in dependence on receiving the cancellation signal 155. Step 640 may comprise outputting a signal to the user interface 130 to cease generation of the parking aid interface 500. The user interface 130 may thus be controlled to discontinue outputting an indication of the location of the objects.

If the parking aid interface 500 is generated as a parking aid display element 500 on a display device, as in FIG. 4B and FIG. 5B, step 640 may comprise inhibiting the parking aid display element 500. The parking aid display element 500 may be inhibited by removing the parking aid display element 500 from the vehicle display, or by reducing a prominence of the parking aid display element 500 on the vehicle display. In some embodiments, inhibiting the parking aid display element 500 comprises removing or reducing the indication 520 of the objects from the parking aid display element 500. That is, the parking aid display element 500 may be maintained on the display, but the indication 520 of the objects may be reduced in prominence or removed.

If the parking aid interface 500 is generated by one or more audio output devices for providing audible output indicative of the location of the one or more objects, step 640 may comprise inhibiting the parking aid interface by inhibiting the audible output. The audible output may be inhibited by removing the audible output. The audible output may be alternatively inhibited by reducing a prominence of the audible output, for example by reducing a volume of the audible output.

It will be appreciated that in some embodiments, the parking aid interface 500 may comprise both a parking aid display element and one or more audio output devices for providing audible output. Inhibiting the parking aid interface 500 may thus comprise inhibiting one or both of the parking aid display element 500 and the audible output.

When the parking aid interface 500 is inhibited, the control system 110 may be configured to inhibit or prevent new generation of the parking aid interface 500. That is, the detection of objects by the proximity sensors may not trigger the generation of the parking aid interface 500 whilst the parking aid interface is inhibited. The parking aid interface 500 may be replaced by another screen of a GUI when inhibited. In this way, the parking aid interface is prevented from regenerating following the user inhibition, when the parking aid interface is not desired.

In some embodiments, an indication may be output to the user that the parking aid interface 500 has been inhibited. The indication may for example comprise a display element on the user interface 130, for example a light, icon or other visible notification. The display element may be persistent whilst the parking aid interface 500 is inhibited, in order to provide feedback to the user that the parking aid interface 500 will not be generated automatically at present. However, the indication may be prone to being missed by a driver engaged in a task such as parking the vehicle.

The control system 110 may be configured to enable a manual override of the inhibition, if the user wishes to regenerate the parking aid interface 500. The control system 110 may receive a disinhibition signal from the user input device 150, following a user input to re-enable the parking aid interface 500. In dependence on receiving such a disinhibition signal, the method 600 returns to steps 610 and 620.

If no manual override is made, according to embodiments of the invention the control system 110 is configured to inhibit the parking aid interface until one or more conditions are met. The one or more conditions are predetermined such that the parking aid interface 500 is not inhibited for an unduly long time. For example, the user may inhibit the parking aid interface 500 at the start of a parking manoeuvre, such as when approaching a wall or other barrier ahead of the vehicle that the user is aware of. However, the user may then need to reverse the vehicle to reposition the vehicle.

Although the user inhibited the interface when approaching the wall, the user may still wish to be notified if an unexpected obstacle approaches the rear of the vehicle during the reversing portion of the same manoeuvre. It may thus be desired to suppress the inhibition of the parking aid interface 500 automatically to allow for such events.

Method 600 may thus comprise determining in step 650 whether a torque configuration change signal 145 has been received by the control system 110. As described, the torque configuration change signal 145 is indicative of a change in a torque configuration selection of the vehicle made by the driver of the vehicle. In some embodiments, the torque configuration change signal 145 comprises a gear change signal 145 indicative of a change in a gear selection of the vehicle made by the driver of the vehicle. However, it will be appreciated that reference to the gear change signal 145 is also applicable to other torque configuration change signals 145. A change in the gear selection may be interpreted as representing a new portion of a vehicle manoeuvre, for example from a forward portion to a reverse portion or vice versa. As such, the gear change signal 145 may be used as a condition for the suppression of the parking aid interface inhibition, as it may be determined that for each new portion of the vehicle manoeuvre the parking aid interface should become available for generation in case the vehicle should approach a new object.

If a gear change signal 145 is received in step 650, the method 600 proceeds to step 660. In step 660, the control system 110 is configured to suppress the inhibition of the parking aid interface 500 in dependence on the gear change signal 145. Said suppression comprises mitigating the effect of the cancellation signal 155 on the parking aid interface 500. For example, if the parking aid interface 500 would otherwise still be displayed had the cancellation signal 155 not been received, the suppression may comprise immediately regenerating the parking aid interface 500. Alternatively, or additionally, suppressing the inhibition may comprise enabling future generation of the parking aid interface 500. For example, if the parking aid interface 500 would otherwise have been ceased to be generated due to no objects being detected within a threshold distance of the vehicle 200, the parking aid interface 500 may not immediately be generated in step 660. Rather, the parking aid interface 500 may be made available for generation at such time that the vehicle 200 approaches an object.

In some embodiments, an indication may be output to the user that the parking interface is not inhibited in step 660. By not inhibited, it is meant that the parking aid interface 500 is available to be generated when the vehicle 200 approaches an object. The indication may for example comprise a display element on the user interface 130, for example a light, icon or other visible notification. The display element may be persistent whilst the parking aid interface 500 is available, in order to provide feedback to the user that the parking aid interface 500 will be generated automatically when the vehicle 200 approaches an object.

Figure 7:
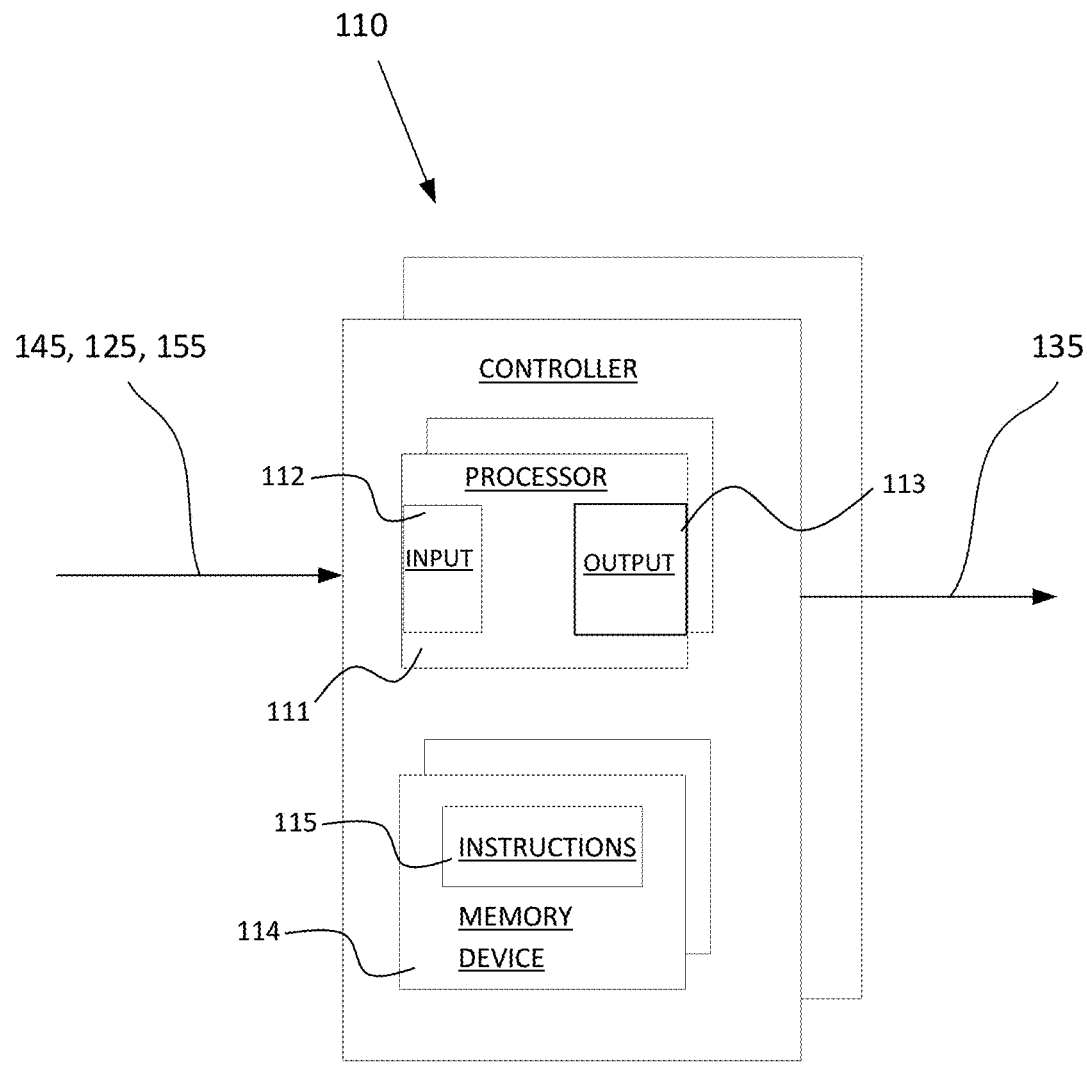
FIG. 7 shows a schematic illustration of the control system according to an embodiment of the invention.

With reference to FIG. 7, there is illustrated a simplified example of a control system 110 such as may be adapted to implement the method described herein. The control system 110 may be that illustrated in FIG. 1. The control system 110 comprises one or more controllers 1000 and is configured to generate a parking aid signal 135 for assisting a driver of the vehicle. The control system 110 is configured to receive proximity data 125 indicative of a location of one or more objects in an environment of the vehicle 200. The control system 110 is configured to output, to a parking aid interface 500 of the vehicle, parking aid data 135 indicative of the location of at least some of the one or more objects. The control system 110 is configured to receive a cancellation signal 155 indicative of a user input for inhibiting the parking aid interface 500. The control system 110 is configured to receive a gear change signal 145 indicative of a change in a gear selection of the vehicle. The control system 110 is configured to suppress the inhibition of the parking aid interface in dependence on the gear change signal 145.

It is to be understood that the or each controller 1000 can comprise a control unit or computational device having one or more electronic processors (e.g., a microprocessor, a microcontroller, an application specific integrated circuit (ASIC), etc.), and may comprise a single control unit or computational device, or alternatively different functions of the or each controller 1000 may be embodied in, or hosted in, different control units or computational devices. As used herein, the term "controller," "control unit," or "computational device" will be understood to include a single controller, control unit, or computational device, and a plurality of controllers, control units, or computational devices collectively operating to provide the required control functionality. A set of instructions could be provided which, when executed, cause the controller 1000 to implement the control techniques described herein (including some or all of the functionality required for the method described herein). The set of instructions could be embedded in said one or more electronic processors of the controller 1000; or alternatively, the set of instructions could be provided as software to be executed in the controller 1000. A first controller or control unit may be implemented in software run on one or more processors. One or more other controllers or control units may be implemented in software run on one or more processors, optionally the same one or more processors as the first controller or control unit. Other arrangements are also useful.

In the example illustrated in FIG. 7, the or each controller 1000 comprises at least one electronic processor 111 having one or more electrical input(s) 112 for receiving one or more input signals, and one or more electrical output(s) 113 for outputting one or more output signals. The or each controller 1000 further comprises at least one memory device 114 electrically coupled to the at least one electronic processor 111 and having instructions 115 stored therein. The at least one electronic processor 111 is configured to access the at least one memory device 114 and execute the instructions 115 thereon.

The, or each, electronic processor 111 may comprise any suitable electronic processor (e.g., a microprocessor, a microcontroller, an ASIC, etc.) that is configured to execute electronic instructions. The, or each, electronic memory device 114 may comprise any suitable memory device and may store a variety of data, information, threshold value(s), lookup tables or other data structures, and/or instructions therein or thereon. In an embodiment, the memory device 114 has information and instructions for software, firmware, programs, algorithms, scripts, applications, etc. stored therein or thereon that may govern all or part of the methodology described herein. The processor, or each, electronic processor 111 may access the memory device 114 and execute and/or use that or those instructions and information to carry out or perform some or all of the functionality and methodology describe herein.

The at least one memory device 114 may comprise a computer-readable storage medium (e.g. a non-transitory or non-transient storage medium) that may comprise any mechanism for storing information in a form readable by a machine or electronic processors/computational devices, including, without limitation: a magnetic storage medium (e.g. floppy diskette); optical storage medium (e.g. CD-ROM); magneto optical storage medium; read only memory (ROM); random access memory (RAM); erasable programmable memory (e.g. EPROM ad EEPROM); flash memory; or electrical or other types of medium for storing such information/instructions.

Example controllers 1000 have been described comprising at least one electronic processor 111 configured to execute electronic instructions stored within at least one memory device 114, which when executed causes the electronic processor(s) 111 to carry out the method as hereinbefore described. However, it is contemplated that the present invention is not limited to being implemented by way of programmable processing devices, and that at least some of, and in some embodiments all of, the functionality and or method steps of the present invention may equally be implemented by way of non-programmable hardware, such as by way of non-programmable ASIC, Boolean logic circuitry, etc.

It will be appreciated that various changes and modifications can be made to the present invention without departing from the scope of the present application.

The invention claimed is:

1. A parking aid control system for a vehicle, the control system comprising at least one controller, the control system being configured to:
   receive proximity data indicative of a location of at least one object in an environment of the vehicle;
   selectively output a signal to generate a parking aid interface in dependence on the location of the at least one object;
   output, to the parking aid interface of the vehicle, parking aid data indicative of the location of the at least one object;
   receive a cancellation signal indicative of a user input for inhibiting the parking aid interface;
   inhibit, in dependence on the cancellation signal, the parking aid interface by inhibiting the selective output of the signal to generate the parking aid interface;
   receive a gear change signal indicative of a change in a gear selection of the vehicle; and
   suppress the inhibition of the parking aid interface in dependence on the gear change signal.

2. The parking aid control system according to claim 1, wherein the control system is configured to suppress the inhibition of the parking aid interface by outputting the signal to generate the parking aid interface.

3. The parking aid control system according to claim 1, wherein the control system is configured to suppress the inhibition by enabling the selective output of the signal to generate the parking aid interface.

4. The parking aid control system according to claim 1, wherein:
   the parking aid interface comprises a parking aid display element on a vehicle display; and
   the control system is configured to inhibit the parking aid interface by inhibiting the parking aid display element on the vehicle display.

5. The parking aid control system according to claim 1, wherein the parking aid interface comprises one or more audio output devices for providing audible output indicative of the location of the at least one object; and
   the control system is configured to inhibit the parking aid interface by inhibiting the audible output.

6. The parking aid control system according to claim 1, wherein the gear change signal is indicative of a change between a forward gear and a reverse gear or a neutral gear and a drive gear of the vehicle.

7. The parking aid control system according to claim 1, wherein the parking aid interface comprises a cancellation element, and the cancellation signal is a selection of the cancellation element.

8. A vehicle comprising the parking aid control system according to claim 1.

9. A computer-implemented method of providing parking aid in a vehicle, the method comprising:
   receiving proximity data indicative of a location of at least one object in an environment of the vehicle;
   selectively outputting a signal to generate a parking aid interface in dependence on the location of the at least one object;
   outputting, to the parking aid interface of the vehicle, parking aid data indicative of the location of the at least one object;
   receiving a cancellation signal indicative of a user input for inhibiting the parking aid interface;
   inhibiting, in dependence on the cancellation signal, the parking aid interface by inhibiting the selective output of the signal to generate the parking aid interface
   receiving a gear change signal indicative of a change in a gear selection of the vehicle; and
   suppressing the inhibition of the parking aid interface in dependence on the gear change signal.

10. A non-transitory computer-readable medium comprising instructions which, when executed by at least one processor, cause the at least one processor to perform the method of claim 9.

* * * * *